E. L. OPPERMANN.
CONTAINER FOR SECONDARY BATTERIES.
APPLICATION FILED AUG. 22, 1908.
932,637.
Patented Aug. 31, 1909.
2 SHEETS—SHEET 1.
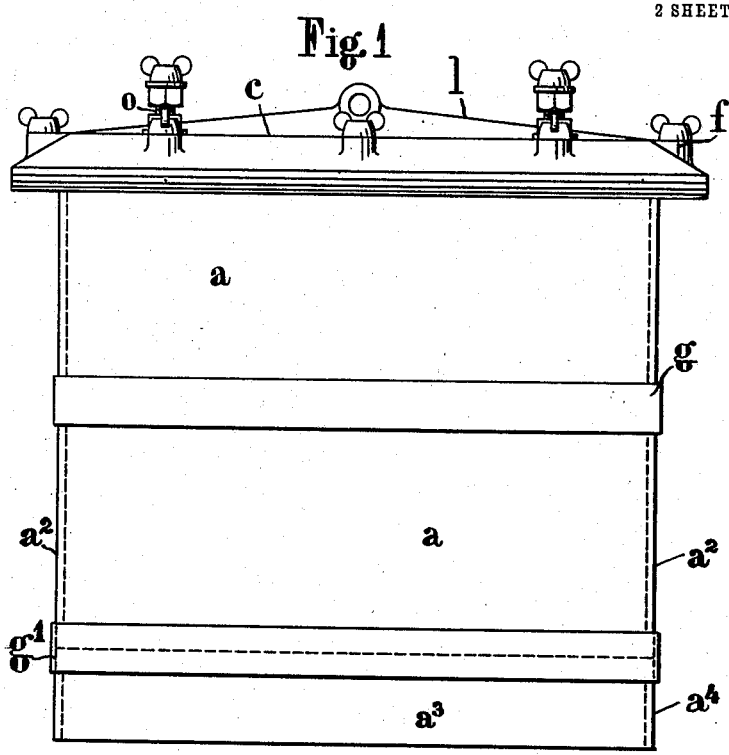
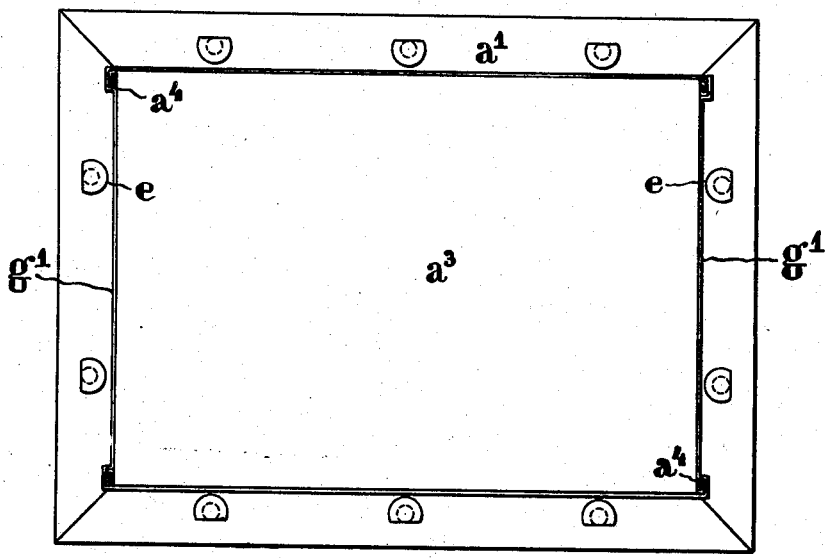
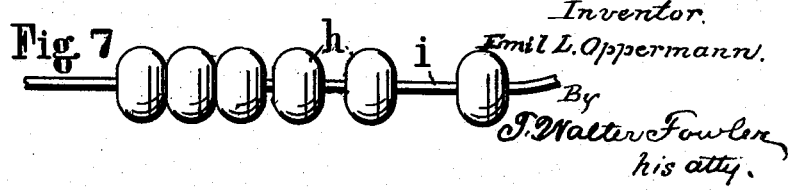
Witnesses.
C. W. Fowler
A. C. Heap
Inventor.
Emil L. Oppermann.
By J. Walter Fowler
his atty.

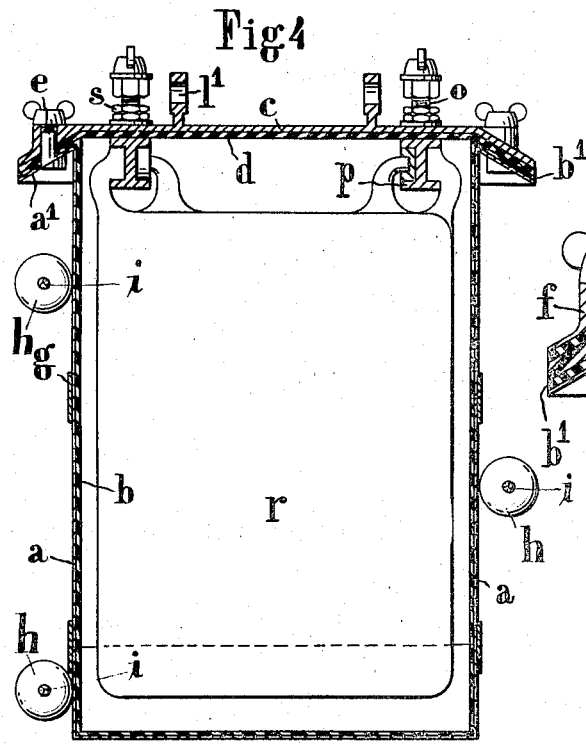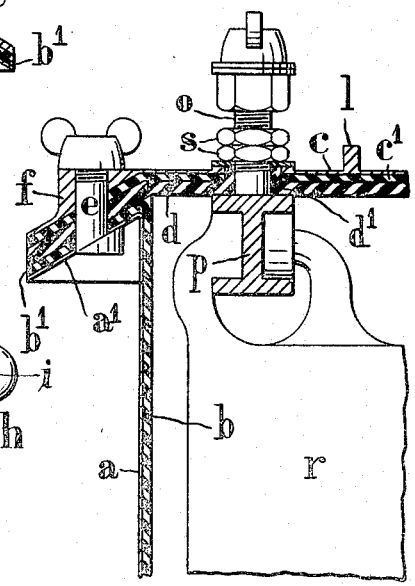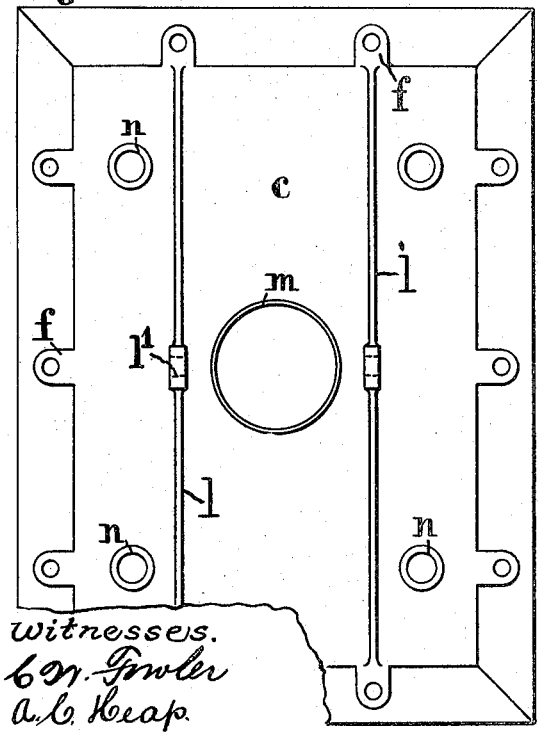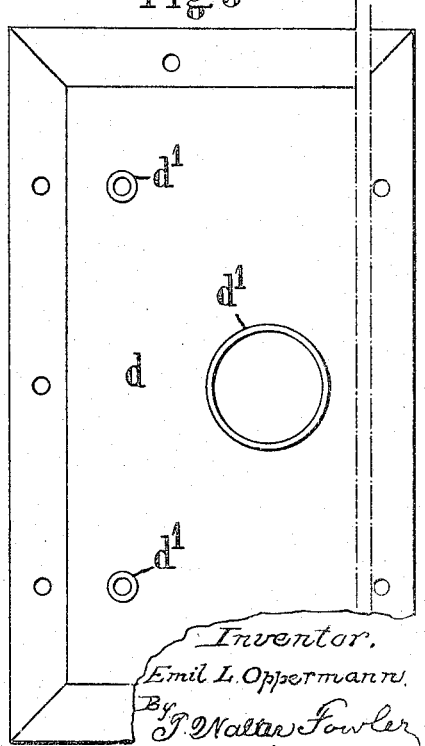

UNITED STATES PATENT OFFICE.

EMIL LAURENCE OPPERMANN, OF LONDON, ENGLAND.

CONTAINER FOR SECONDARY BATTERIES.

932,637.  Specification of Letters Patent.  Patented Aug. 31, 1909.

Application filed August 22, 1908. Serial No. 449,761.

*To all whom it may concern:*

Be it known that I, EMIL LAURENCE OPPERMANN, a subject of the King of England, and residing at London, England, electrical engineer, have invented a certain new and useful Improvement in Containers for Secondary Batteries, of which the following is a full, clear, and exact description.

This invention relates to secondary batteries and has reference to the construction of the container or casing for the cells of which the battery is composed.

It has for its object the construction of a composite container which shall be free from the defects of existing containers, and consists essentially of a thin metal frame or body lined with ebonite, vulcanite or the like. The frame is flanged or lipped at top, this lip being preferably bent below the horizontal so as to afford with a correspondingly-shaped lid and a rubber gasket, an efficient seal or joint to the lid which in particular will prevent creeping or leakage of the acid.

The invention is particularly applicable to use in storage batteries employed in submarine vessels.

The invention is hereafter described with reference to the accompanying drawings, in which:—

Figure 1 is an elevation of the composite container. Fig. 2 is a plan of the composite container, from the underside. Fig. 3 is a plan of the lid. Fig. 4 is a sectional elevation of the composite container. Fig. 5 shows a suitable form of rubber gasket. Fig. 6 is a part section on a larger scale of a modified form. Fig. 7 shows the flexible insulator cord.

The body $a$ of the container may be made of pressed sheet-steel or other suitable metal, formed to the trough, tank, or box-shape desired. The top edges $a'$ of this body are flanged over and preferably bent down as before stated and the body and the down-turned lips or flanges so formed are sheathed or lined with ebonite or vulcanite $b$ $b'$. The lips $a'$ being bent down can be of greater width than if allowed to remain horizontal, and conversely for the same width of lip adjacent containers may be brought closer together.

The body so formed by casting, stamping and blocking, or the like is provided with a lid $c$ also of metal which likewise may be faced with ebonite $c'$ and is shaped at its edges to correspond with the flanges or lips $a'$ of the body $a$. Fig. 4 shows the container body cast or stamped in one piece. A rubber gasket or the like $d$ is interposed between the lid $c$ and the body portion $a$ $a'$ and clamps may be provided to hold the parts together. In the drawings I have shown bolts $e$ passing through bosses $f$ in the lid $c$ for this purpose.

The body $a$ of the container may be furnished with strengthening bands if required, as indicated for example at $g$ and it is coated with non-corrosive paint or the like. The bands may be secured to the body and bottom by soldering or by other suitable means. There may also be provided externally around the same a suitable insulating arrangement and this may consist for example of a number of insulators $h$ threaded upon a flexible support such as a cord $i$ wound around the body $a$ of the container. It is intended to wind such an insulating cord around alternate containers, only one such guard or insulator being necessary between adjacent containers.

The lid $c$ is preferably provided with transverse ribs $l$ to strengthen the same and at suitable positions are provided a hole $m$ for a vent and holes $n$ for the terminals $o$, the rubber $d$ below the lid being preferably extended up through said holes and about said vent and terminals in the form of nipples or sleeves $d'$. The connecting bars $p$ from which the plates $r$ of the cell are supported may be suspended from the lid by means of one or more nuts $s$ screwed on the lugs of said bar above said lid, and these lugs $o$ of opposite bars form the terminals.

The ribs $l$ are shown perforated at $l'$ so that when the lid has been unfastened from the tank, the lid carrying and supporting the cell plates may be lifted away from the container. For this purpose a chain or the like lifting device may be passed through the holes $l'$.

The improved container or casing above described may be made of any convenient sizes and thickness and the body may be made of any suitable metal. For example the body may be made of sheet-iron tinned, of one sixteenth of an inch thickness and the ebonite lining may be, for example, of one eighth of an inch thickness; other thicknesses or proportions may, however, be used.

It will be noticed from an examination of Fig. 2, that the sides and ends of the metal body are joined by overlapping and rolling their medium and vertical edges around one another so as to form folded seams A⁴. In this way the tank body may be made of several pieces of metal and a flat-surfaced interior to the metal body is thus provided for the ebonite lining. The bottom $a^3$ of the tank is shown in Fig. 1 secured to the body $a$ by means of one of the aforesaid bands $g'$. The bottom $a^3$ is formed in one piece, the sides and ends being connected and fastened together by seams $a^4$ corresponding with the seams $a^2$ of the body $a$. The lining may be secured in position in any convenient manner, for instance by rolling or by pressure from within in the course of construction.

The lid may be made of sheet metal lined with ebonite or the like, or it may be made as a plain metal casting, shaped to the downturned lips of the body or container.

It is to be noted that this improved container is incombustible, non-brittle and non-leaking. It may be made comparatively light in weight and is much cheaper in cost than containers made entirely of vulcanite or similar acid-proof and insulating material, which need to be of considerable sectional thickness.

Having thus described my invention what I claim as such and desire to secure by Letters Patent is:—

1. A container for the cells of a secondary battery, comprising a thin metal holder of tank shape, a lip to said tank holder, said lip extending outwardly from and around the tank top and being downturned, a lining of insulating material within said tank and extended over said downturned lip, a correspondingly shaped lid covering said tank and said lip, and a rubber washer between said lip and lid, with means for holding the lid in position.

2. A container for the cells of a secondary battery, comprising a thin metal holder of tank shape, a lip to said tank holder, said lip extending outwardly from and around the tank top and being downturned, a lining of insulating material within said tank and extended over said downturned lip, a correspondingly shaped lid covering said tank and said lip, said lid being of metal and faced on its underside with insulating material, a rubber gasket between the lid and the tank and means for clamping the lid over the tank.

3. A container for secondary-battery cells, comprising a tank body of thin metal, a flanged lip to said tank body extending outwardly from the top of said body, said lip being continuous and downturned on each of the sides of the said body, strengthening bands around said tank body, a sheathing of insulating material on the interior of said tank body and extending over said lip, a lid to said tank, said lid being shaped at its edges to correspond with and to cover said flanged lip, a rubber gasket arranged between said lid and lip, and means for securing said lid to said tank.

4. A container for secondary-battery cells, comprising a tank body of thin metal, an outwardly extending flange from the top of each side of said tank body, said lips being downturned and connected together to form a continuous lip, a lining of insulating material to said tank body, said lining being continued over said lip, a lid covering said tank body and shaped at its edges to conform with said downturned lip, said lid having holes for a vent and terminals, a rubber gasket between said lid and tank, said gasket having hollow nipples passing up said holes, and means for holding said lid to said tank.

5. A container for secondary-battery cells, comprising a tank body of thin metal, an outwardly extending flange from the top of each side of said tank body, said lips being downturned and connected together to form a continuous lip, a lining of insulating material to said tank body, said lining being continued over said lip, a lid covering said tank body and shaped at its edges to conform with said downturned lip, said lid having holes for a vent and terminals, a rubber gasket between said lid and tank, said gasket having hollow nipples passing up said holes, and means for securing said lid to said tank.

6. A container for secondary-battery cells, comprising a tank body of thin sheet metal, a flanged lip at the top of said tank, extending outwardly from said tank, said lip being downturned, a lining to said tank, said lining being of insulating material and extending over said lip, a lid to said tank, said lid having its edges adapted to correspond with the downturned lip of said tank, a rubber gasket between said lid and said tank, said lid having passages for the vent and plate terminals, hollow sleeves on said gasket adapted to pass up said passages in the lid and to insulate said vent and terminals, and means for securing said lid to said tank.

7. A container for secondary-battery cells, comprising a tank body of thin sheet metal, a flanged lip at the top of said tank, extending outwardly from said tank, said lip being downturned, a lining to said tank, said lining being of insulating material and extending over said lip, a lid to said tank, said lid having its edges adapted to correspond with the downturned lip of said tank, a rubber gasket between said lid and said tank, said lid having passages for the vent and plate-terminals, hollow sleeves on said gasket adapted to pass up said passages in the lid and to insulate said vent and terminals, transverse ribs upon said lid, means for engaging said ribs whereby said lid may be lifted, and means for bolting said lid to said tank.

8. A container for secondary-battery cells, comprising a thin metal tank body, outwardly extending flanges at the top of said tank body to form a continuous lip, said lip being downturned, a lining to said tank body of insulating material, said lining being continued over said downturned lip, a lid to said tank, said lid having edges shaped to correspond with the downturned lip and to afford with the latter a seal, a rubber gasket between said tank, tank lip and lid, said lid having holes and hollow nipples extending from the gasket up through said holes, bolts passing through said lip and the edges of said lid, nuts co-acting with said bolts to secure said lid to the tank body and bosses on the downturned edges of the lid to afford seatings for said nuts.

9. A container for secondary-battery cells, comprising a thin metal tank body, outwardly extending flanges at the top of said tank body to form a continuous lip, said lip being downturned, a lining to said tank body of insulating material, said lining being continued over said downturned lip, a coating of non-corrodible material on the exterior of said tank body, a lid to said tank, said lid having edges shaped to correspond with and fit over the downturned lip, a rubber gasket between said tank and lid, said lid having passages for the vent and terminals and sleeves formed on said gasket extending up through said passages, said lid having means whereby it may be secured to said tank body.

10. A container for secondary-battery cells, comprising a thin metal body, a flanged lip from said body, said lip extending outwardly and angularly downwardly, an interior lining to said body of insulating material, said lining being continued over said lip, a lid to said tank body, having its edges shaped to correspond with said lip, a gasket between said lid and said body, means for holding said lid to said tank body, said lid having passages through it, hollow sleeves formed on the gasket and extending up through said passages, a flexible support wound about the exterior of the tank body and insulators threaded upon said flexible support.

11. A container for secondary-battery cells, comprising a tank body of sheet metal, a flanged lip at the top of said body, said lip being downturned angularly from the said body and outwardly therefrom, a lining of ebonite or vulcanite to said tank body, said lining being continued over said lip, a lid to said tank body having edges shaped to correspond with said lip, a rubber gasket between said lid and body, means for holding said lip to said body so that by means of the interposed gasket a seal is formed between said lid and lip, said lid having passages through its middle portion for the vent and plate terminals, hollow sleeves for the vent and terminals passing from the gasket up through said passages and surrounding strengthening bands formed upon the outside of said tank body.

12. A container for secondary-battery cells, comprising a sheet metal tank body, a lip extending outwardly and angularly downward from the top of said body, a lining of insulating material for said tank body, said lining extending over the angular lip, a metal lid to said tank body, said lid having edges downturned to correspond with the top of said tank, a sheathing of insulating material on the underside of said lid, a gasket between said lid-sheathing and said tank, said lid and lid-lining having passages for vent and cell-terminals, sleeves for said vent and terminals integral with said gasket so as to isolate said terminals from said lid, and means for holding the parts together.

13. A container for secondary-battery cells, comprising a thin metal body of rectangular tank shape, a lip extending from each side of said rectangular tank, said lips being continuous one with the other and downturned angularly, a lining for the interior of said tank, said lining being of insulating material and extending over said lid, a rubber gasket between said lid and tank, said lid having holes for the passage of the terminals and vent, strengthening bands around the exterior of said tank body, a coating of non-corrodible material on the exterior of said tank and bands, bosses on the lip of the lid to afford a square seating and bolts passing through holes in said lip and bosses on the lid edges, said bolts having nuts bearing on said seatings.

In witness whereof I have hereunto set my hand in presence of two witnesses.

EMIL LAURENCE OPPERMANN.

Witnesses:
VICTOR F. FEENY,
CYRIL J. FEENY.